(12) United States Patent
Tehranipoor et al.

(10) Patent No.: US 10,929,741 B2
(45) Date of Patent: Feb. 23, 2021

(54) CROSS-REGISTRATION FOR UNCLONABLE CHIPLESS RFID TAGS

(71) Applicant: University of Florida Research Foundation, Incorporated, Gainesville, FL (US)

(72) Inventors: Mark M. Tehranipoor, Gainesville, FL (US); Kun Yang, Gainesville, FL (US); Domenic J. Forte, Gainesville, FL (US); Ulbert Botero, Gainesville, FL (US); Haoting Shen, Tallahassee, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 0 days.

(21) Appl. No.: 16/434,402

(22) Filed: Jun. 7, 2019

(65) Prior Publication Data

US 2019/0385038 A1 Dec. 19, 2019

Related U.S. Application Data

(60) Provisional application No. 62/686,220, filed on Jun. 18, 2018.

(51) Int. Cl.
| | | |
|---|---|---|
| *G06K 19/077* | (2006.01) | |
| *G06K 7/10* | (2006.01) | |
| *H01Q 13/10* | (2006.01) | |
| *H01Q 1/38* | (2006.01) | |
| *H01Q 1/22* | (2006.01) | |

(52) U.S. Cl.
CPC ..... *G06K 19/07773* (2013.01); *G06K 7/10356* (2013.01); *H01Q 1/2225* (2013.01); *H01Q 1/38* (2013.01); *H01Q 13/10* (2013.01)

(58) Field of Classification Search
USPC ........................................................ 235/492
See application file for complete search history.

(56) References Cited

U.S. PATENT DOCUMENTS

| | | | |
|---|---|---|---|
| 6,229,445 B1 * | 5/2001 | Wack ................. | G06K 19/0672 340/572.7 |
| 8,282,011 B1 * | 10/2012 | Skoine ............. | G06K 19/07758 235/492 |
| 8,502,677 B2 | 8/2013 | Pintos et al. | |

(Continued)

OTHER PUBLICATIONS

Islam et a., *A Novel Compact Printable Dual-Polarized Chipless RFID System*, IEEE Transactions on Microwave Theory and Techniques, vol. 60, No. 7, Jul. 2012, pp. 2142-2151.

(Continued)

*Primary Examiner* — Allyson N Trail
(74) *Attorney, Agent, or Firm* — Alston & Bird LLP

(57) ABSTRACT

An unclonable chipless radio frequency identification (RFID) tag and corresponding cross-registration methods of determining an identity and/or tag signature of an RFID tag are described. In an example embodiment, an unclonable chipless RFID tag comprises a first tag portion comprising one or more first conductive members unremovably secured to a dielectric item; and a second tag portion comprising packaging conductive pattern. The first tag portion and the second tag portion are in a static or fixed physical relationship with respect to one another.

20 Claims, 16 Drawing Sheets

(56) References Cited

U.S. PATENT DOCUMENTS

| | | | | |
|---|---|---|---|---|
| 2008/0238675 | A1* | 10/2008 | Yang | G06K 19/07798 340/572.1 |
| 2014/0263659 | A1* | 9/2014 | Kervinen | G06K 19/027 235/488 |
| 2015/0011602 | A1 | 1/2015 | Huang et al. | |
| 2015/0199602 | A1* | 7/2015 | van der Weide | G06K 7/10366 340/10.1 |
| 2015/0310327 | A1 | 10/2015 | Karmakar et al. | |
| 2015/0347712 | A1* | 12/2015 | Flori | G06Q 10/087 705/28 |
| 2016/0172742 | A1* | 6/2016 | Forster | G08B 13/2428 343/878 |
| 2017/0330066 | A1* | 11/2017 | Gibson | G06K 19/0672 |
| 2020/0016042 | A1* | 1/2020 | Wiesner | A61J 15/0088 |

OTHER PUBLICATIONS

Shlens, *A Tutorial on Principal Component Analysis*, Cornell University Library, arXiv, Apr. 2014, pp. 1-12, [retrieved from the Internet Jun. 24, 2019] <URL: https://arxiv.org/pdf/1404.1100.pdf>.

Xiaoyang et al., *An Encryption Method for QR Code Image Based on ECA*, International Journal of Security and its Applications, vol. 7, No. 5, Sep. 2013, pp. 397-406, [retrieved from the Internet Jun. 24, 2019] <URL: http://dx.doi.org/10.14257/ijsia.2013.7.5.36>.

Janaswamy et al., *Characteristic Impedance of a Wide Slotline on Low-Permittivity Substrates*, IEEE Transactions on Microwave Theory and Techniques, vol. MTT-34, No. 8, Aug. 1986, pp. 900-902.

Preradovic et al., *Chipless RFID: Bar Code of the Future*, IEEE Microwave Magazine, Dec. 2010, pp. 87-97.

Devadas et al., *Design and Implementation of PUF-Based 'Unclonable' RFID ICs for Anti-Counterfeiting and Security Applications*, Proceedings of the 2008 IEEE International Conference on RFID, Apr. 2008, pp. 58-64.

Preradovic et al., *Design of Fully Printable Planar Chipless RFID Transponder With 35-Bit Data Capacity*, Proceedings of the 39th European Microwave Conference, Sep.-Oct. 2009, pp. 13-16.

Ahmed et al., *Dielectric Properties of Butter in the MW Frequency Range as Affected by Salt and Temperature*, Journal of Food Engineering, vol. 82, Oct. 2007, pp. 351-358.

Sareni et al., *Effective Dielectric Constant of Random Composite Materials*, Journal of Applied Physics, Mar. 1997, Author Copy, 9 pages.

Lee et al., *Elliptic Curve Based Security Processor for RFID*, IEEE Transactions on Computers, Nov. 2008, pp. 1-14.

Akansu et al., *Emerging Applications of Wavelets: A Review*, Physical Communication, vol. 3, Mar. 2010, pp. 1-18.

Sahu et al., *Encryption in QR code Using Stegnography*, International Journal of Engineering Research and Applications, vol. 3, No. 4, Jul.-Aug. 2013, pp. 1738-1741.

Sadeghi et al., *Enhancing RFID Security and Privacy by Physically Unclonable Functions*, Towards Hardware-Intrinsic Security, Oct. 2010, pp. 1-26.

Kilcarr, *FreightWatch: Cargo Theft Risk Will Rise in 2015*, FleetOwner, Mar. 2015, pp. 1-2, [retrieved from the Internet Jun. 24, 2019] <URL: http://www.fleetowner.com/fleet-management/freightwatch-cargo-theft-risk-will-rise-2015>.

Hocouet et al., *Harvesting the Potential of Nano-CMOS for Lightweight Cryptography: An Ultra-Low-Voltage 65 Nm AES Coprocessor for Passive RFID Tags*, Journal of Cryptographic Engineering, Apr. 2011, pp. 1-8.

U.S. Department of Homeland Security, *Intellectual Property Rights Seizure Statistics: Fiscal Year 2014*, (2015), pp. 1-12.

Izenman, *Linear Discriminant Analysis*, Modern Multivariate Statistical Techniques, (2013), pp. 237-280.

Preradovic et al., *Multiresonator-Based Chipless RFID System for Low-Cost Item Tracking*, IEEE Transactions on Microwave Theory and Techniques, vol. 57, No. 5, May 2009, pp. 1411-1419.

Barrera et al., *Optical Encryption and QR Codes: Secure and Noise-Free Information Retrieval*, Optics Express, Feb. 2013, vol. 21, No. 5, pp. 5373-5378.

Batina et al., *Public-Key Cryptography for RFID-Tags*, Proceedings of the Fifth Annual IEEE International Conference on Pervasive Computing and Communications Workshops, Mar. 2007, 16 pages.

*Radio Frequency Fundamentals*, Cisco Connected Mobile Experiences (CMX) CVD, Sep. 2014, Chapter 10, pp. 1-6.

Liu et al., *Recognition of QR Code With Mobile Phones*, 2008 Chinese Control and Decision Conference, Jul. 2008, pp. 203-206.

Ha et al., *Replacing Cryptography With Ultra Wideband (UWB) Modulation in Secure RFID*, Proceedings of the 2007 IEEE International Conference on RFID, Mar. 2007, pp. 23-29.

Yu et al., *Securing RFID With Ultra-Wideband Modulation*, CiteSeer, 2006, pp. 1-12, [retrieved from the Internet Jun. 24, 2019] <URL: http://citeseerx.ist.psu.edu/viewdoc/summary?doi=10.1.1.130.8658.

Gassend et al., *Silicon Physical Random Functions*, Proceedings of the 9th ACM Conference on Computer and Communications Security, Nov. 2002, 13 pages.

Silva et al., *Speeding Up All-Pairwise Dynamic Time Warping Matrix Calculation*, Proceedings of the 2016 SIAM International Conference on Data Mining, May 2016, 9 pages.

Yang et al., *UCR: An Unclonable Chipless RFID Tag*, 2016 IEEE International Symposium on Hardware Oriented Security and Trust, May 2016, pp. 7-12.

Bishop, *UPC Bar Code Has Been in Use 30 Years / Once-Controversial Technology Is Now Ubiquitous*, SFGATE, Jul. 2004, pp. 1-3.

\* cited by examiner

Table I: PCB manufacturing tolerances

| PCB Manufacturer | Trace Width / Air Gap Tolerance | PCB Thickness Tolerance |
|---|---|---|
| Advanced Circuits | max(±20%, ±0.002") | max(±10%, ±0.005") |
| Sunstone | ±20% | ±10% |
| Sierra Circuits | ±0.001" | ±10% |
| Precision PCBS | ±20% | ±0.005" |
| RUSH PCB | ±0.005" | ±10% |

FIG. 15

Table II: Simulation parameters. N() represents a normal distribution. U{a, b} represents a discrete uniform distribution. U(a, b) represents a continuous uniform distribution. Substrate I and II are plastic film and pharmaceutical tablet respectively.

| Variable | Parameter | Value |
|---|---|---|
| $sub1\_d$ | Substrate I diameter | 10 mm |
| $patch\_d$ | Patch diameter | 9.4 mm |
| $void\_d$ | Central void diameter | 3.1 mm |
| $g_i$ | Air gap i (i=1, ..., 12) | N(0.1mm, 0.0169mm) |
| $Cu\_t$ | Copper thickness | 0.035 mm |
| $sub1\_t$ | Substrate I thickness | 0.25 mm |
| $sub2\_t$ | Substrate II thickness | N(5mm, 0.1667mm) |
| $\varepsilon_r^1$ | Substrate I dielectric constant | 2.8 |
| $\varepsilon_r^2$ | Substrate II dielectric constant | 2.42 |
| $n_p$ | Number of particles | U{0, 20} |
| $d_i$ | Particle i diameter (i=1, ..., $n_p$) | U(0.2mm, 1mm) |
| $RD$ | Reading distance | 50 mm |

FIG. 16

Table I: Unsupervised recognition performance comparison

| Classification Technique | Recognition Rate |
|---|---|
| Lorentzian Distance | 95.56% |
| Manhattan Distance | 92.65% |
| Normalized Correlation Coefficient | 92.65% |
| Wavelet Transform Manhattan Distance | 98.67% |

FIG. 17

CROSS-REGISTRATION FOR UNCLONABLE CHIPLESS RFID TAGS

CROSS-REFERENCE TO RELATED APPLICATIONS

This application claims priority to U.S. Application No. 62/686,220, filed Jun. 18, 2018, the content of which is hereby incorporated by reference in its entirety.

BACKGROUND

Today's supply chain is highly complex, diverse, and extensive. While globalization has optimized resource allocation and reduced manufacturing cost, it also exposes the supply chain to more risks such as counterfeiting, theft, etc. Not only do these risks compromise the profits and reputations of manufacturers, distributors, and retailers, but they also pose a threat to human and asset safety. In 2014, for example, over twenty thousand Intellectual Property Rights (IPR) infringing seizures were reported with a total value of $1.22 billion. In the same year, FreightWatch International recorded 794 cargo thefts throughout the United States.

Track-and-trace techniques form the foundation for an improved supply chain by providing supply chain owners and/or participants with visibility into supply chain status and enabling them to systematically detect and control counterfeiting, theft, etc., but existing approaches tend to be costly, inconvenient, unreliable, or insecure. Barcodes have traditionally been used to track and trace commodities in the supply chain. QR codes with greater storage capacity have also been put into use more recently. QR codes can be encrypted to prevent unauthorized information extraction. However, both barcodes and QR codes are very easy to duplicate because of visibility and controllability of pixel information (even though adversaries cannot easily retrieve the actual content from encrypted QR codes). Other shortcomings (e.g., requirement of individual scanning, direct line-of-sight, close proximity to scanner, etc.) severely impact the overall utility of barcodes, QR codes, and other optical labels.

Radio Frequency Identification (RFID) is growing in popularity as a replacement of barcodes and QR codes. For example, Wal-Mart and the United States Department of Defense have published requirements that their vendors place RFID tags on all shipments to improve supply chain management. Compared with traditional optical labels, an RFID-based track-and-trace system has many engaging features—supports batch scanning, does not require direct line-of-sight for access, and needs less human involvement for data collection—making automatic track and trace possible. However, the relatively higher price of IC-based RFID tags makes them inappropriate for protecting the supply chain of low-cost commodities. Additionally, IC-based RFID tags may be susceptible to being copied or duplicated.

BRIEF SUMMARY

Example embodiments provide improved unclonable, chipless RFID (UCR) tags. Various embodiments provide a cross-registration approach for an unclonable chipless RFID (CRUCR) tag that intrinsically generates a unique ID from multiple entropy sources. An example CRUCR tag consists of two parts: (i) a first tag portion comprising one or more first conductive members unremovably secured to a product; and (ii) a second tag portion comprising one or more second conductive members integrated into a packaging, wherein the product is enclosed within the packaging. In various embodiments, the one or more second conductive members comprise a conductive pattern (e.g., a certain number of copper concentric ring slot resonators) integrated on the external surface of product package (e.g., plastic cavity or pocket of blister pack that packages, for example, pharmaceutical tablets). In various embodiments, the one or more first conductive members comprise metal (e.g., nontoxic silver for pharmaceuticals) particles of random quantity with random diameters embedded in random places of the product (e.g., pharmaceutical tablet). In an example embodiment, the diameter of a CRUCR tag is approximately 10 mm.

Various embodiments provide a CRUCR tag to establish an inseparable connection between CRUCR tag and a product. Various embodiments provide a split manufacturing approach for CRUCR tags to combat replay attack. Various embodiments provide a product-level track-and-trace technique to protect, for example, the pharmaceutical supply chain. Each product (e.g., pharmaceutical tablet) has its own unique signature. The signatures of all products within the same package (e.g., a blister pack) would be bound together to add another layer of security and be resistant against illegal product replacement. Various embodiments provide performance evaluation of CRUCR tags under extremely adverse environmental conditions (e.g., noisy environment, varying angles of plane wave incidence, etc.). Various embodiments provide various supervised and unsupervised methods that employ machine learning for identifying CRUCR tags based on their frequency response spectra to a probe signal.

According to a first aspect, an unclonable chipless radio frequency identification (RFID) tag is provided. In an example embodiment, the tag comprises a first tag portion comprising one or more first conductive members unremovably secured to a dielectric item; and a second tag portion comprising a conductive pattern, wherein the first tag portion and the second tag portion are in a static physical relationship with respect to one another.

In an example embodiment, (a) the dielectric item is a product, (b) the conductive pattern is fixed to and/or part of a packaging, and (c) the product is enclosed within the packaging. In an example embodiment, the first conductive members are randomly distributed on and/or in at least a portion of the dielectric item.

According to another aspect, a method for reading an unclonable chipless radio frequency identification (RFID) tag is provided. In an example embodiment, the method comprises reading a tag spectra of the RFID tag using an RFID reader; determining a feature vector of the tag spectra (e.g., via a processor); and identifying a first tag from a database storing a plurality of enrolled tags (e.g., via a processor). The first tag is associated with an enrolled feature vector that has a minimum distance from the feature vector of the tag spectra compared to a remainder of the plurality of enrolled tags. The method further comprises responsive to determining that the minimum distance satisfies the tag matching threshold (e.g., via a processor), providing an indication of the entity of the tag (e.g., via a communications interface and/or one or more output elements).

According to still another aspect, an apparatus for determining the identity of an unclonable chipless radio frequency identification (RFID) tag is provided. In an example embodiment, the apparatus comprises at least one processor, a memory storing computer program code, and a communications interface. The memory and the computer program code are configured to, with the processor, cause the apparatus to at least receive a tag spectra of the RFID tag read using an RFID reader; determine a feature vector of the tag spectra; and identify a first tag from a database storing a plurality of enrolled tags. The first tag is associated with an enrolled feature vector that has a minimum distance from the feature vector of the tag spectra compared to a remainder of the plurality of enrolled tags. The memory and the computer program code are further configured to, with the processor, cause the apparatus to at least, responsive to determining that the minimum distance satisfies the tag matching threshold, provide an indication of the entity of the tag.

According to still another aspect, a method for manufacturing an unclonable chipless radio frequency identification (RFID) tag is provided. In an example embodiment, the method comprises manufacturing a product, the product having one or more first conductive members unremovably secured to the product; preparing a packaging for the product, the packaging having one or more second conductive members integrated into the packaging; and enclosing the product within the packaging. In an example embodiment, the method further comprises capturing one or more instances of a tag spectra generated by the unclonable chipless RFID tag using an RFID reader; determining one or more principal components of the tag spectra; projecting the tag spectra into a reduced dimensional space using the principal components; applying a transformation matrix to the tag spectra projected into the reduced dimensional space to generate a feature vector for unclonable chipless RFID tag; and storing the feature vector in a database in association with information corresponding to the unclonable chipless RFID tag.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 10:
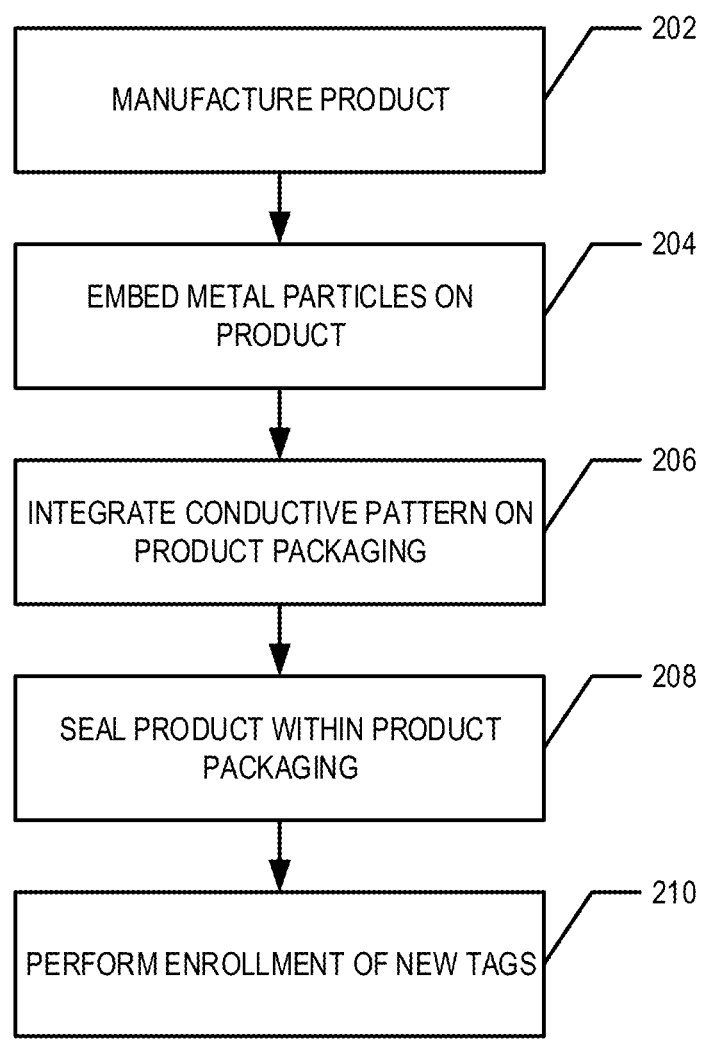

FIG. 10 provides a flowchart illustrating operations, processes, and/or procedures for manufacturing a CRUCR tag in accordance with various embodiments.

Figure 11:
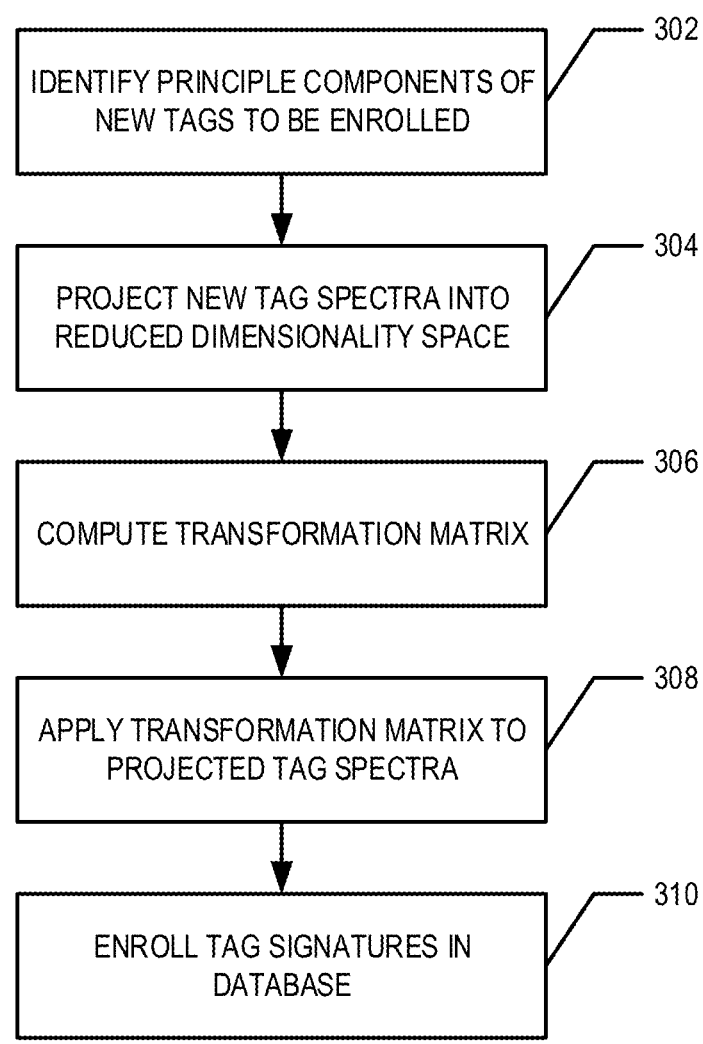
Figure 12:
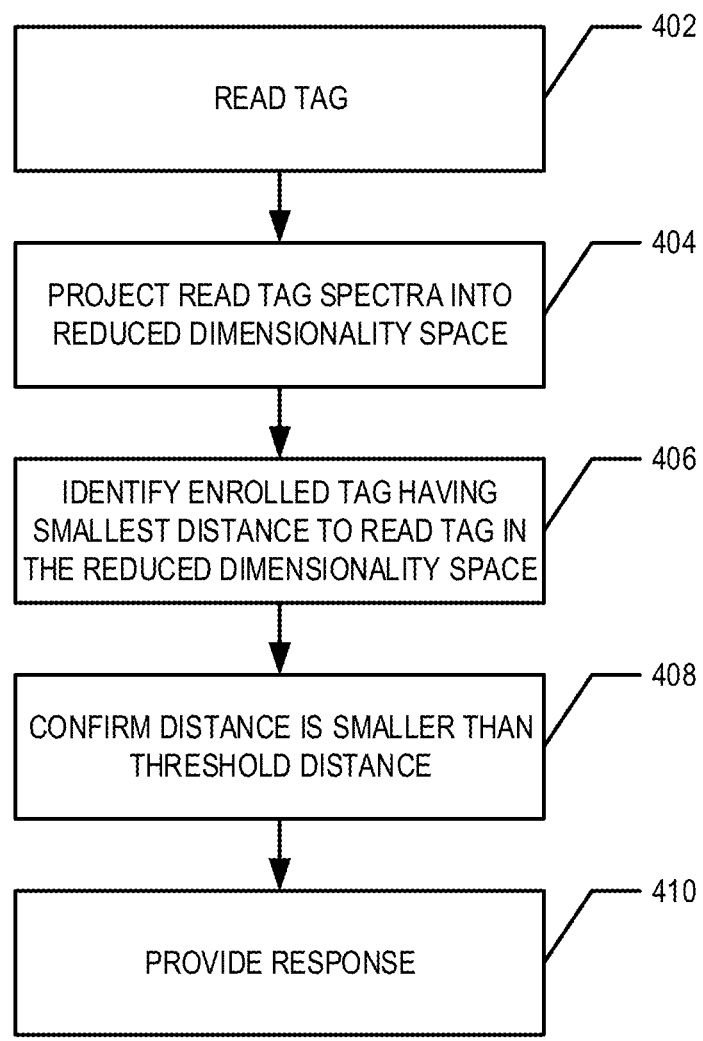

FIGS. 11-12 provide flowcharts illustrating operations, processes, and/or procedures for enrolling a CRUCR tag in a database and identifying a read CRUCR tag in a supervised machine learning based tag authentication system, in accordance with various embodiments.

Figure 13:
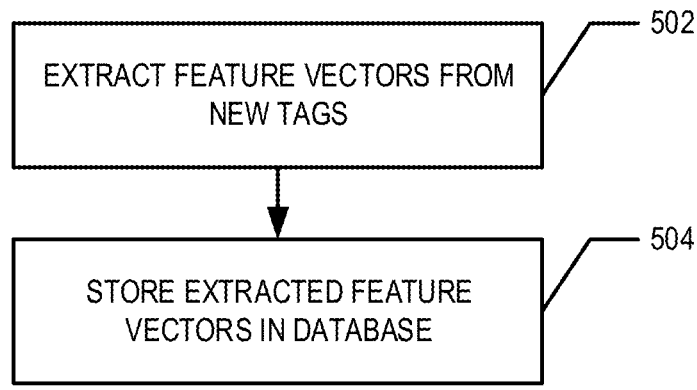
Figure 14:
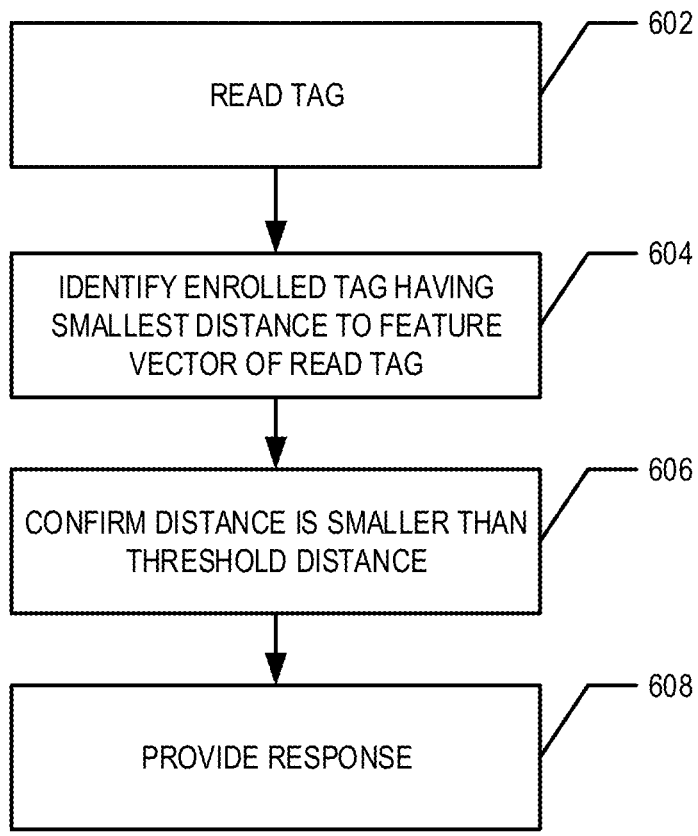

FIGS. 13-14 provide flowcharts illustrating operations, processes, and/or procedures for enrolling a CRUCR tag in a database and identifying a read CRUCR tag in an unsupervised machine learning based tag authentication system, in accordance with various embodiments.

FIG. 15 provides a table of some example PCB manufacturing tolerances, in accordance with an example embodiment.

FIG. 16 provides a table of parameters of a simulation performed in accordance with an example embodiment.

FIG. 17 provides a table showing the efficiency of various tag recognition techniques, in accordance with an example embodiment.

DETAILED DESCRIPTION OF EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. As used herein, the term "approximately" refers to tolerances within manufacturing and/or engineering standards.

I. BRIEF OVERVIEW

Example embodiments of the present invention provide CRUCR tags that can be used, for example, to identify a packaged product at the individual product level. For example, a CRUCR tag of the present invention may be used to identify an individual pharmaceutical tablet packaged within a blister pack. The CRUCR tag may be identified using a model trained using machine learning. In an example embodiment, the tag comprises a first tag portion comprising one or more first conductive members unremovably secured to a dielectric item; and a second tag portion comprising a conductive pattern, where the first tag portion and the second tag portion are in a static physical relationship with respect to one another. For example, in an example embodiment, a CRUCR tag comprises (i) a first tag portion comprising one or more first conductive members unremovably secured to a product and (ii) a second tag portion comprising one or more second conductive members integrated into a packaging. The product is enclosed within the packaging. In an example embodiment, the first conductive members comprise and/or consist of a metal particles of random quantity with random diameters embedded in random places on and/or in the product. In an example embodiment, the second conductive members comprise and/or consist of conductive pattern integrated on the external surface of product package (e.g., plastic cavity or pocket of blister pack that packages, for example, pharmaceutical tablets). In an example embodiment, the conductive pattern is a set of copper concentric ring slot resonators. In an example embodiment, the metal particles are nontoxic silver particles embedded on and/or in, for example, a pharmaceutical tablet (e.g., where the pharmaceutical tablet is the product).

II. COMPUTER PROGRAM PRODUCTS, METHODS, AND COMPUTING ENTITIES

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps, operations, or processes. Thus, embodiments of the present invention may also take the form of an entirely hardware embodiment, an entirely computer program product embodiment, and/or an embodiment that comprises combination of computer program products and hardware performing certain steps, operations, or processes.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps, operations, or processes specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

Figure 1:
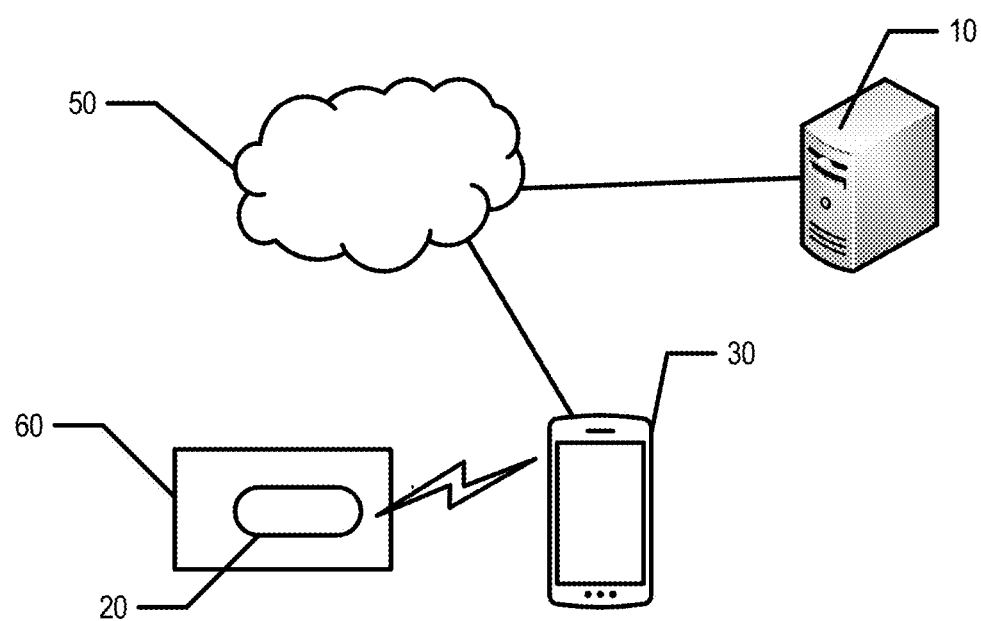
FIG. 1 is an overview of a system that can be used to practice embodiments of the present invention.

FIG. 1 provides an illustration of an exemplary embodiment of the present invention. As shown in FIG. 1, this particular embodiment may include one or more network computing entities 10, one or more user computing entities 30, one or more networks 50, one or more packaged products 60 (e.g., products 20 each packaged in corresponding packaging 40 and possibly in additional packaging such as paper box 65 shown in FIG. 4) and/or the like. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Network Computing Entity

Figure 2:
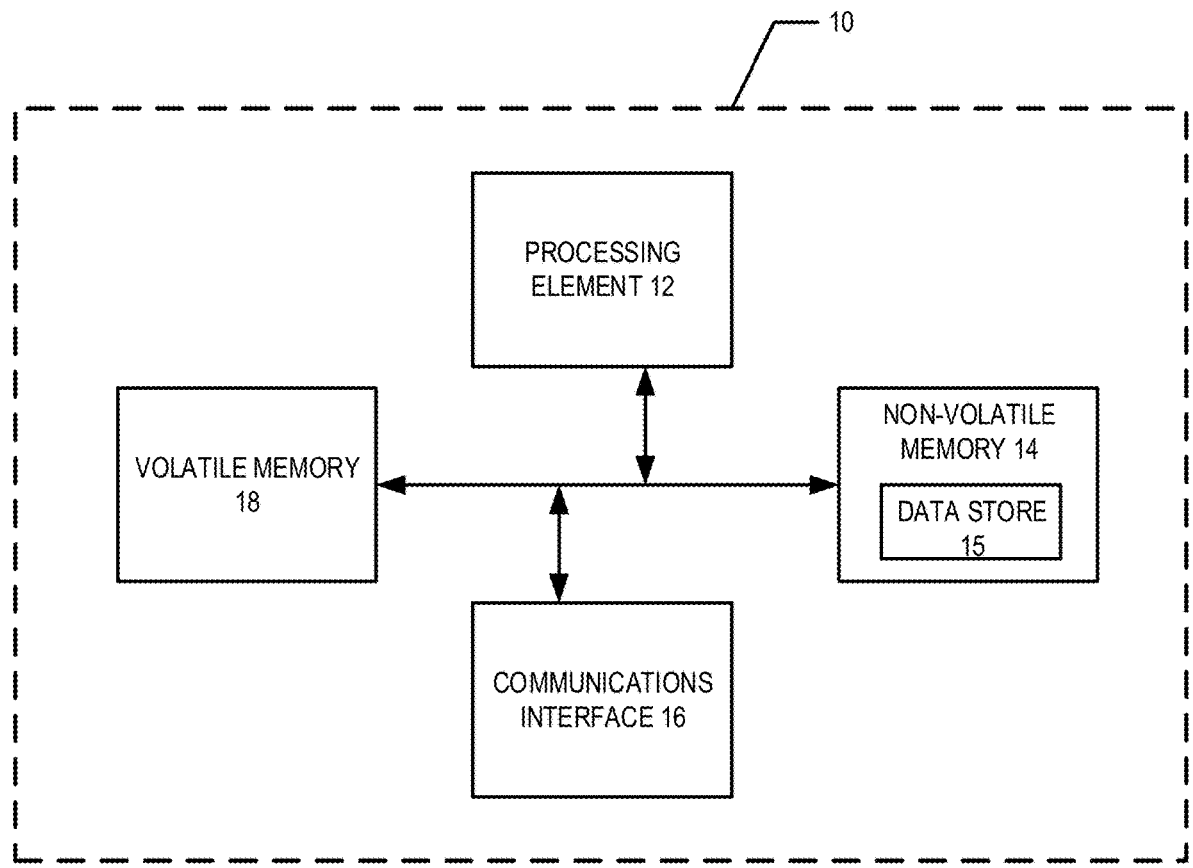
FIG. 2 is an exemplary schematic diagram of a system computing entity according to one embodiment of the present invention.

FIG. 2 provides a schematic of a network computing entity 10 according to one embodiment of the present invention. A network computing entity may be any computing entity that stores at least a portion of enrolled tag data store. For example, the enrolled tag data store may comprise one or more databases and/or the like storing tag signatures for one or more enrolled CRUCR tags. For example, in an example embodiment, the network computing entity 10 may receive a tag spectra from a user computing entity 30, determine and/or identify an identity of the read CRUCR tag based on the tag spectra read from the read CRUCR tag, and provide the identity of the read CRUCR tag (e.g., to the user computing entity 30 and/or via a user interface). In an example embodiment, the network computing entity 10 may be configured to train a model determining a tag signature and/or matching a tag spectra captured and/or read from a read CRUCR tag to a tag signature stored in the enrolled tag data store.

In general, the terms computing entity, computer, entity, device, system, and/or similar words used herein interchangeably may refer to, for example, one or more computers, computing entities, desktops, mobile phones, tablets, phablets, notebooks, laptops, distributed systems, servers or server networks, blades, gateways, switches, processing devices, processing entities, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on information/data, content, information, and/or similar terms used herein interchangeably.

As indicated, in one embodiment, the network computing entity 10 may also include one or more communications interfaces 16 for communicating with various computing entities, such as by communicating information/data, content, information, and/or similar terms used herein interchangeably that can be transmitted, received, operated on, processed, displayed, stored, and/or the like. For instance, the network computing entity 10 may communicate with one or more user computing entities 30 and/or the like.

As shown in FIG. 2, in one embodiment, the network computing entity 10 may include or be in communication with one or more processing elements 12 (also referred to as processors, processing circuitry, processing device, and/or similar terms used herein interchangeably) that communicate with other elements within the network computing entity 10 via a bus, for example. As will be understood, the processing element 12 may be embodied in a number of different ways. For example, the processing element 12 may be embodied as one or more complex programmable logic devices (CPLDs), microprocessors, multi-core processors, coprocessing entities, application-specific instruction-set processors (ASIPs), microcontrollers, and/or controllers. Further, the processing element 12 may be embodied as one or more other processing devices or circuitry. The term circuitry may refer to an entirely hardware embodiment or a combination of hardware and computer program products. Thus, the processing element 12 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 12 may be configured for a particular use or configured to execute instructions stored in volatile or non-volatile media or otherwise accessible to the processing element 12. As such, whether configured by hardware or computer program products, or by a combination thereof, the processing element 12 may be capable of performing steps, operations, or processes according to embodiments of the present invention when configured accordingly.

In one embodiment, the network computing entity 10 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 14, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, information/data, applications, programs, program modules, scripts, source code, object code, byte code, compiled code, interpreted code, machine code, executable instructions, and/or the like. The terms database, database instance, database management system, and/or similar terms used herein interchangeably may refer to a structured collection of records or data that is stored in a computer-readable storage medium, such as via a relational database, hierarchical database, and/or network database. For example the enrolled tag data store 15 may be stored in the non-volatile memory 14.

In one embodiment, the network computing entity 10 may further include or be in communication with volatile media (also referred to as volatile storage, memory, memory storage, memory circuitry and/or similar terms used herein interchangeably). In one embodiment, the volatile storage or memory may also include one or more volatile storage or memory media 18, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, information/data, applications, programs, program modules, scripts, source code, object code, byte code, compiled code, interpreted code, machine code, executable instructions, and/or the like being executed by, for example, the processing element 12. Thus, the databases, database instances, database management systems, information/data, applications, programs, program modules, scripts, source code, object code, byte code, compiled code, interpreted code, machine code, executable instructions, and/or the like may be used to control certain aspects of the operation of the network computing entity 10 with the assistance of the processing element 12 and operating system.

As indicated, in one embodiment, the network computing entity 10 may also include one or more communications interfaces 16 for communicating with various computing entities, such as by communicating information/data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOC SIS), or any other wired transmission protocol. Similarly, the network computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Bluetooth protocols, Wibree, Home Radio Frequency (HomeRF), Simple Wireless Abstract Protocol (SWAP), wireless universal serial bus (USB) protocols, and/or any other wireless protocol.

Although not shown, the network computing entity 10 may include or be in communication a user interface comprising one or more input elements and one or more output elements. In an example embodiment, the one or more input elements may comprise various ones and/or combinations of a keyboard input, a mouse input, a touch screen/display input, motion input, movement input, audio input (e.g., microphone), pointing device input, joystick input, keypad input, and/or the like. In an example embodiment, the one or more output elements may comprise various ones and/or combinations of audio output (e.g., speakers), video output, screen/display output, motion output, movement output, and/or the like.

As will be appreciated, one or more of the network computing entity's 10 components may be located remotely from other network computing entity 10 components, such as in a distributed system. Furthermore, one or more of the components may be combined and additional components performing functions described herein may be included in the network computing entity 10. Thus, the network computing entity 10 can be adapted to accommodate a variety of needs and circumstances. As will be recognized, these architectures and descriptions are provided for exemplary purposes only and are not limiting to the various embodiments.

2. Exemplary User Computing Entity

Figure 3:
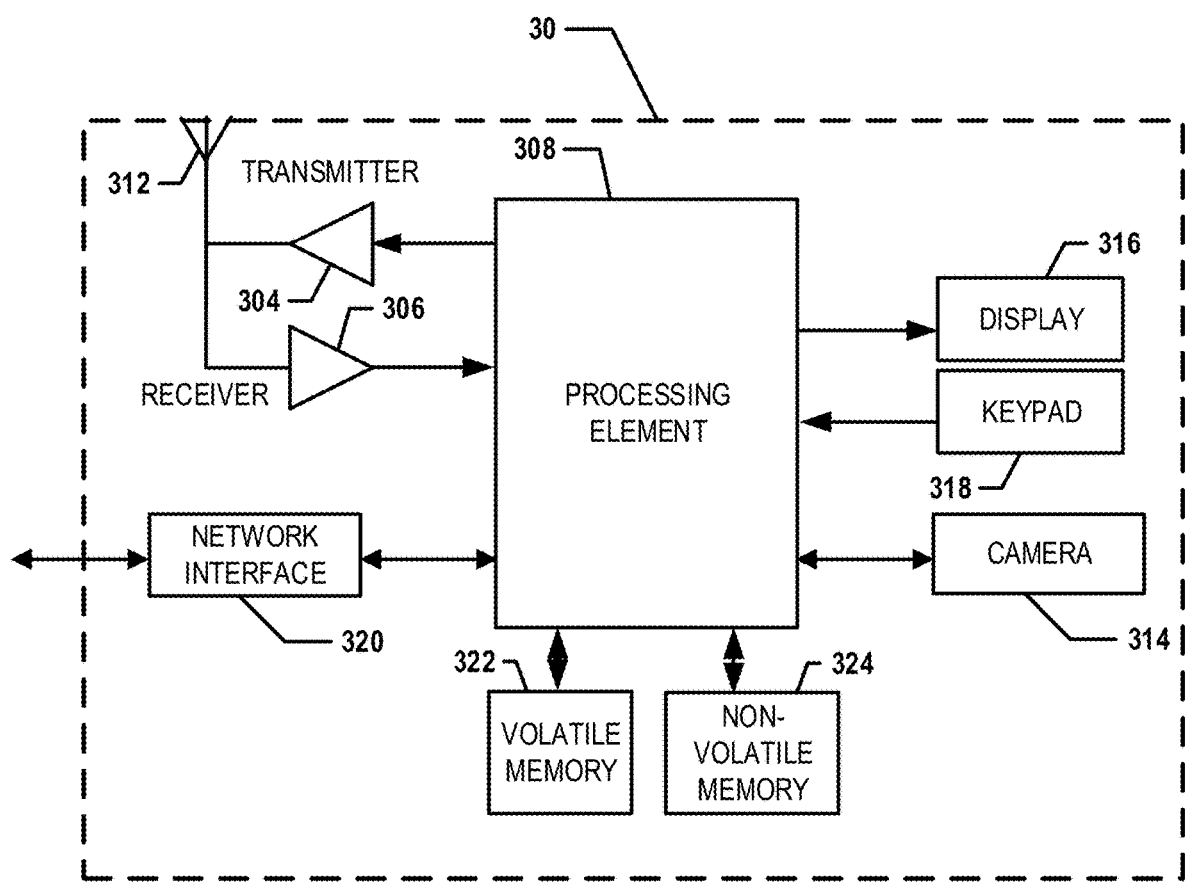
FIG. 3 is an exemplary schematic diagram of a scanner computing entity according to one embodiment of the present invention.

FIG. 3 provides an illustrative schematic representative of a user computing entity 30 that can be used in conjunction with embodiments of the present invention. In various embodiments, a user computing entity 30 is a scanning device and/or comprises a scanning device (RFID reader and/or transceiver) configured for reading one or more RFID tags (e.g., CRUCR tags). In an example embodiment, the user computing entity 30 is configured to provide a tag spectra read and/or captured from an RFID tag (e.g., a CRUCR tag) to a network computing entity 10 (e.g., via one or more wired and/or wireless networks 50).

In one embodiment, a user computing entity 30 may include one or more components that are functionally similar to those of the network computing entity 10. In general, the terms device, system, computing entity, entity, and/or similar words used herein interchangeably may refer to, for example, one or more computers, computing entities, mobile phones, tablets, phablets, notebooks, laptops, input terminals, servers or server networks, blades, gateways, switches, processing devices, processing entities, network access points, base stations, the like, and/or any combination of devices or entities adapted to perform the functions, operations, and/or processes described herein. As shown in FIG. 3, the user computing entity 30 may include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user computing entity 30 may be capable of operating with one or more air interface standards, communication protocols, modulation types, and access types. More particularly, the user computing entity 30 may operate in accordance with any of a number of wireless communication standards and protocols, such as those described above with regard to the network computing entity 10. In a particular embodiment, the user computing entity 30 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, NFC, Bluetooth, USB, Wibree, HomeRF, SWAP, and/or the like. Similarly, the user computing entity 30 may operate in accordance with multiple wired communication standards and protocols, such as those described above with regard to the network computing entity 10 via a network interface 320.

Via these communication standards and protocols, the user computing entity 30 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include a location determining aspects, device, module, functionality, and/or similar words used herein interchangeably. For example, the user computing entity 30 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire information/data, sometimes known as ephemeris information/data, by identifying the number of satellites in view and the relative positions of those satellites (e.g., using GPS). The satellites may be a variety of different satellites, including LEO satellite systems, DOD satellite systems, the European Union Galileo positioning systems, the Chinese Compass navigation systems, Indian Regional Navigational satellite systems, and/or the like. This data can be collected using a variety of coordinate systems, such as the DD; DMS; UTM; UPS coordinate systems; and/or the like. Alternatively, the location information can be determined/identified by triangulating the user computing entity's 30 position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine/identify the location of someone or something to within inches or centimeters.

The user computing entity 30 may also comprise a user interface (that can include a display 316 coupled to a processing element 308) and/or a user input/interaction interface (coupled to a processing element 308). For example, the user interface may be configured to provide a user with an application, browser, interactive user interface (e.g., graphical user interface (GUI), command line interactive user interface, and/or the like), and/or similar words used herein interchangeably executing on and/or accessible via the user computing entity 30 to interact with and/or cause display of information from the network computing entity 10, as described herein. The user input/interaction interface can comprise any of a number of user input devices allowing the user computing entity 30 to receive information/data, such as a keypad 318 (hard or soft), a touch display, voice/speech/microphone or motion interfaces, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input/interaction interface can be used, for example, to activate or deactivate certain functions, such as screen savers and/or sleep modes.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the user computing entity 30. As indicated, this may include a user application that is resident on the entity or accessible through a browser or other user interface for communicating with the network computing entity 10 and/or various other computing entities.

In another embodiment, the user computing entity 30 may include one or more components or functionality that are the same or similar to those of the network computing entity 10, as described in greater detail above. As will be recognized, these architectures and descriptions are provided for exemplary purposes only and are not limiting to the various embodiments.

IV. EXEMPLARY SYSTEM OPERATION

As noted above, example embodiments provide unclonable, chipless RFID tags and methods, apparatuses, systems, and computer program products for a cross-validation process of recognizing a CRUCR tag.

FIGS. 4, 6, 7, and 9 illustrate example CRUCR tags 150 that consists of two parts: (i) a first tag portion comprising one or more first conductive members 25 unremovably secured to a product 20 and (ii) a second tag portion comprising one or more second conductive members 45 integrated into a packaging 40 (e.g., plastic cavity or pocket of blister pack that packages pharmaceutical tablets, tiny printed circuit boards (PCBs), integrated circuits (ICs), etc.). The product 20 is enclosed within the packaging 40 to provide a packaged product 60. In an example embodiment, the first conductive members 25 comprise and/or consist of a metal particles of random quantity with random diameters embedded in random places on and/or in the product 20. In an example embodiment, the second conductive members 45 comprise and/or consist of a conductive pattern integrated on the external surface of product package 40 (e.g., plastic cavity or pocket of blister pack that packages, for example, pharmaceutical tablets). In an example embodiment, the conductive pattern is a set of concentric ring slot resonators.

Figure 6:
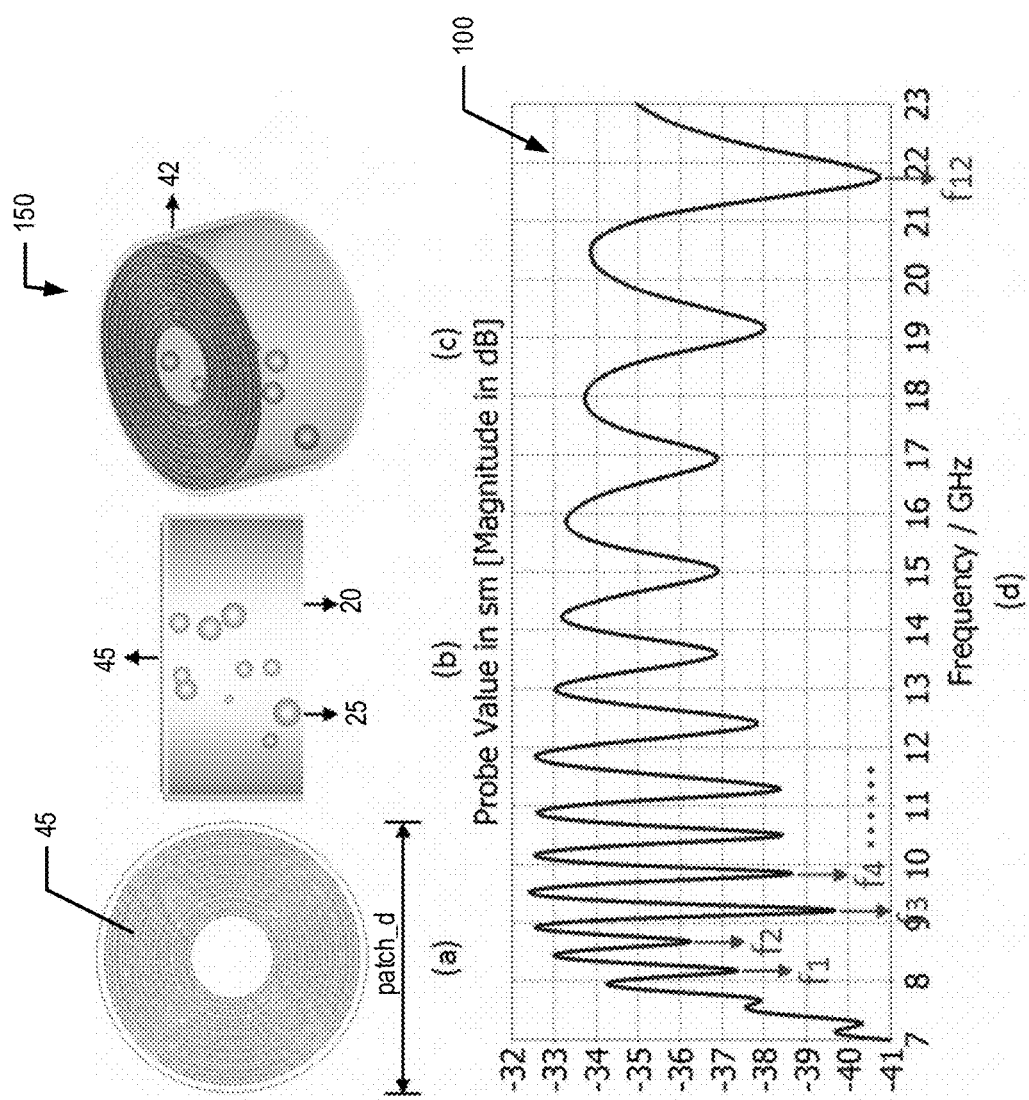
FIG. 6 illustrates various views of an example CRUCR tag and the corresponding frequency response spectrum, according to an example embodiment of the present invention.
Figure 9:
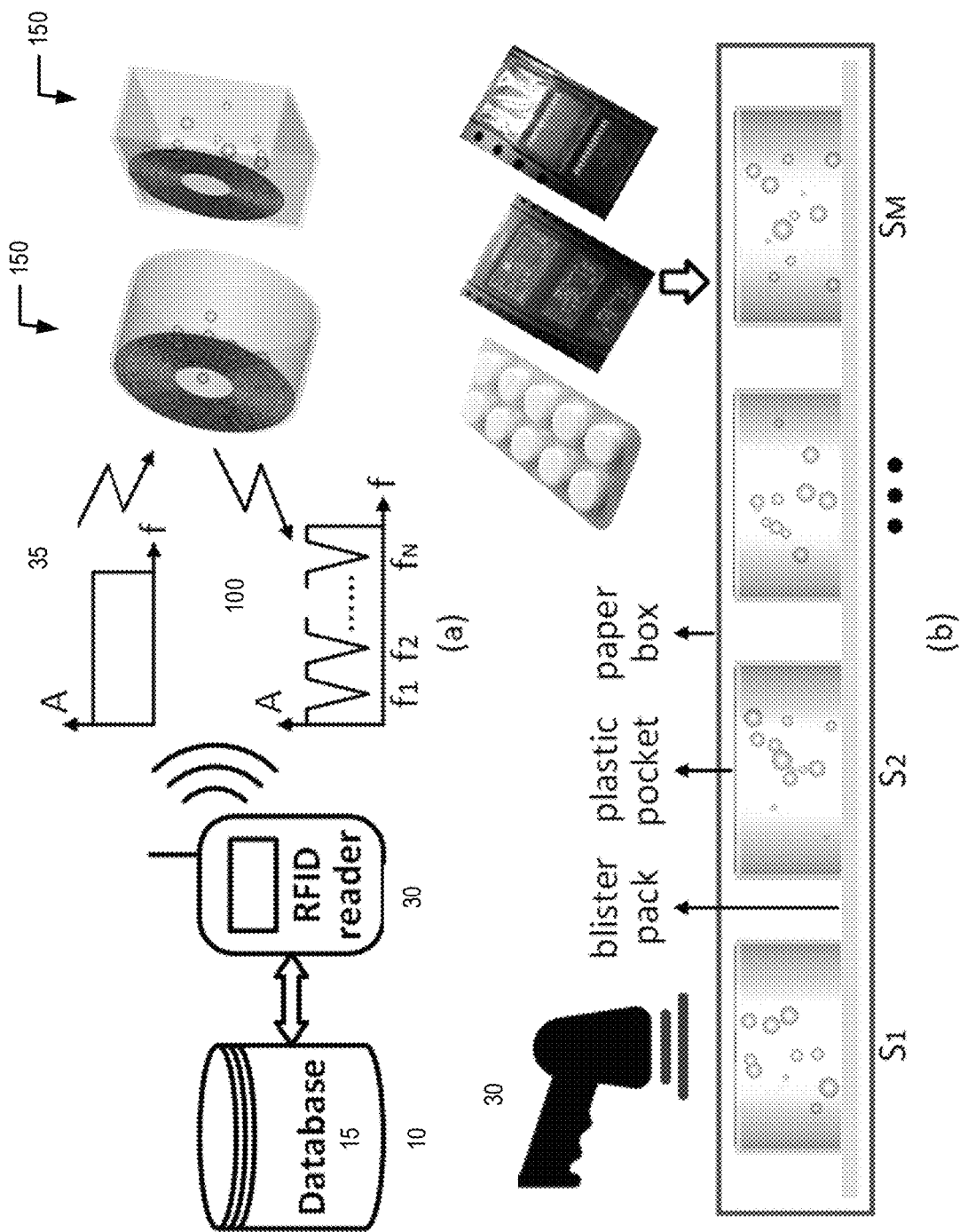
FIG. 9 illustrates an example of using a CRUCR tag to identify a packaged product, according to an example embodiment.

For pharmaceutical products, silver particles could be filled in the body of the product 20 (e.g., tablets). As will be recognized, silver particles are nontoxic and could be broken down by stomach acids. For tiny assembled printed circuit boards (PCBs), copper particles could be embedded in the substrate of PCBs. For integrated circuits (ICs), copper particles could be embedded in the plastic packages or substrates of dies. Other than integrating a conductive pattern (e.g., concentric ring slot resonators) on the plastic cavity or pocket of a blister pack or other packaging 40 that packages the product 20, a conductive pattern (e.g., concentric ring slot resonators) can also be directly integrated on the external surfaces of some products 20 (e.g., wooden or plastic furniture, ICs encapsulated with plastic packages, etc.). When the CRUCR tag 150 is stimulated with a probe signal 35 (e.g., swept-frequency continuous-wave signal (e.g., plane wave)), as illustrated in FIG. 9, the array of resonators (e.g., the first conductive members 25 and the second conductive members 45) will absorb part of the signal energy and introduce attenuations at particular frequencies of the response spectrum. As shown in FIG. 6, the number of fundamental resonance points in the spectrum will correspond to the topology of the conductive pattern provided by the second conductive members 45 (e.g., the number of slot resonators). These resonance points are independent of each other. A user computing entity 30 (e.g., comprising an RFID reader and/or transceiver) may provide the probe signal 35 and capture the frequency response spectrum 100. Since radio frequency signals are capable of traveling through nonmetallic packaging materials such as paper and plastic, the CRUCR system enables product authentication without necessarily opening the package, as shown in FIG. 9(*b*).

Due to process variations during tag manufacturing, the pattern parameters of the second conductive members 45 (e.g., slot parameters such as trace width, air gap, substrate thickness, and substrate dielectric constant in the case of a series of concentric ring slot resonators) of each set of second conductive members 45 will deviate from their design values. The set of second conductive members 45 could be first integrated on an ultra-thin PCB (as thin as 100 µm), which could be later adhered to the external surface of packaging 40 (e.g., plastic cavity or pocket of blister pack) with glue. The merit of this approach is that CRUCR tags 150 could be directly applied to legacy packaging 40 (e.g., blister packs). A more cost-effective approach for second conductive members 45 on packaging 40 is to directly print packaging carrying the second conductive members 45 (e.g., a conductive pattern) using a 3D printer.

Table I provided in FIG. 15 illustrates the manufacturing tolerances of five major PCB manufacturers in the United States. For the trace width and air gap, the maximum deviation between design value and measured value can be as large as 20%. PCB thickness will typically have a tolerance of 10%. The resonance frequencies of a conductive pattern such as a set of slot resonators is sensitive to variations of slot parameters. The randomnesses of metal particles (e.g., random quantities, random diameters, random positions, random sphericities, etc.) will alter the effective dielectric constant of substrate material and more importantly impact the electromagnetic (EM) field distribution when the CRUCR tag 150 is being stimulated by the probe signal 35. Consequently, the resonance frequency of each conductive pattern will deviate from its design value due to the variations of pattern parameters. Because of the randomnesses of process variations and the randomnesses of metal particles, the frequency signature of each CRUCR tag 150 will be unique and different from each other. Thus, the CRUCR tag 150 is unclonable since adversaries cannot easily model the uncontrollable process variations during tag fabrication. Since both process variations of pattern parameters and randomness of metal particles will contribute to the entropy, replacing either the packaging 40 carrying the second conductive members 45 or the product 20 with the first conductive members 25 would inevitably change the tag signature. Consequently, a CRUCR tag 150 is intrinsically resistant to split attacks (e.g., separating the CRUCR tag 150 from the product 20, swapping tags 150, etc.) due to cross-registration of both entropy sources (the first and second conductive members 25, 45). For a CRUCR tag 150 with 12 slot resonators, its diameter could be as small as 10 mm, for example. The signatures ($S_1, S_2, \ldots, S_M$) of all products 20 (e.g., pharmaceutical tablets) within the same packaging 40 (e.g., in the same blister pack) may be bound together (e.g., stored in association with one another in the enrolled tag data store 15) to add another layer of security against illegal and/or unapproved component replacement. CRUCR tags 150 enable pill-level traceability in the pharmaceutical supply chain by assigning a unique signature for each product 20 (e.g., pharmaceutical tablet).

In an example embodiment, the vector ($f_1, f_2, \ldots, f_N$) is used as the identifier of each CRUCR tag 150, where $f_i$ indicates the resonance frequency of the $i_{th}$ slot resonator of the conductive pattern formed by the second conductive members 45. Because of noise interference and angle variation of probe signal 35 incidence, the signatures captured from the same tag 150 may be slightly different at different readings of the CRUCR tag 150. A distance (e.g., Euclidean distance (ED)) between two vectors $\vec{v}_i^j = (f_1^j, f_2^j, \ldots, f_N^j)$ and $\vec{v}_i^k = (f_1^k, f_2^k, \ldots, f_N^k)$ can be used to determine whether these two vectors correspond to the same tag 150, where $\vec{v}_i^j$ and $\vec{v}_i^k$ denote the signatures of the $i_{th}$ tag measured at readings j and k. The Euclidean distance between $\vec{v}_i^j$ and $\vec{v}_i^k$ can be computed as follows $ED_i^{j,k} = |\vec{v}_i^j - \vec{v}_i^k| = \sqrt{\sum_{r=1}^{N}(f_r^j - f_r^k)^2}$. Two signatures are determined to correspond to the same tag 150 if their distance (e.g., Euclidean distance) is not larger than a threshold distance. In an example embodiment, the threshold distance is defined as and/or set to the maximum intra-tag Euclidean distance obtained at the enrollment phase of a set of tags 150.

A. Machine Learning Based Tag Recognition

Supervised machine learning provides a method of guiding the network computing entity 10 (or other appropriate computing entity, such as the user computing entity 30) to correctly learn and classify the features that differentiate the tags 150 from one another. In an example embodiment, a supervised learning technique such as a linear discriminant analysis (LDA) classifier is used. By maximizing the variance between different tag measurements and minimizing the variance within same tag measurements, the classifier is able to distinguish between different tags 150 by focusing on the most discriminant features, a la principal component analysis (PCA). Furthermore, in various embodiments, the classification algorithm of the LDA classifier also serves as a method of dimensionality reduction. For example, the computation of the transformation matrix for LDA is reliant upon being able to compute the inverse within a tag scatter matrix, which means the matrix must be non-singular. However, in practice the opposite is often the case with high dimensional data where the size of the data set is smaller than its dimensionality. This is the case for the simulations described in more detail below, but may not be so in various application where a database could contain as many as millions of CRUCR tags 150. For this reason, PCA may be beneficial for not only dimensionality reduction but also to ensure the resultant matrices after projection are non-singular. Applying PCA prior to computing LDA is a good practice regardless of the size of the data set, since it helps with avoiding overfitting. Therefore, the procedure for implementing a supervised machine learning based tag authentication system, according to an example embodiment, is shown by FIGS. 11 and 12, where FIG. 11 shows the enrollment phase and FIG. 12 shows the determination of the identity of a read CRUCR tag.

Starting at step/operation 302 of FIG. 11, the principal components of the tag data set to be enrolled are determined. For example, a user computing entity 30 may read a plurality of tags to be enrolled and capture a plurality of response spectra 100 from the plurality of tags. The plurality of response spectra 100 may make up at least a portion of the tag data set. The plurality of response spectra 100 may be provided (e.g., by the user computing entity 30) to the network computing entity 10 for analysis. The plurality of response spectra 100 may then be analyzed (e.g., by the network computing entity) to determine the principal components of the tag data set.

At step/operation 304, each of the plurality of response spectra 100 are projected into a reduced dimensional space using the computed principal components. For example, the network computing entity 10 may project each of the response spectra 100 into a reduced dimensional space using the computing principal components. This projection of the response spectra 100 into the reduced dimensional space also ensures non-singular matrices for subsequent LDA computation.

At step/operation 306, LDA is used to compute the transformation matrix using LDA. The transformation matrix maps a response spectra 100 into the reduced dimensional space for classification of the response spectra. For example, the network computing entity 10 may determine and/or compute the transformation matrix using LDA.

At step/operation 308, for each of response spectra 100 of the plurality of response spectra captured from the plurality of tags 150 to be enrolled, the LDA transformation matrix is applied (e.g., multiplied) to the PCA projected response spectra 100 to determine the tag signature of the corresponding tag 150. For example, the network computing entity 10 may multiple each response spectra 100 that has been projected into the reduced dimensional space by the LDA transformation matrix to determine the tag signature for the corresponding tag 150.

At step/operation 310, the determined tag signatures are stored in the enrolled tag data store 15. For example, the network computing entity 10 may store the determined tag signatures in the enrolled tag data store 15.

To determine the identity of a tag 150, the CRUCR tag 150 is read at step/operation 402 of FIG. 12. For example, the user computing entity 30 may emit a probe signal 35 and, responsive thereto, receive a response spectra 100 generated by the interaction of the probe signal 35 and the CRUCR tag 150 (e.g., the first and second conductive members 25, 45). The user computing entity 30 may then provide the captured response spectra 100 to the network computing entity 10. The network computing entity 10 may receive the captured response spectra 100 corresponding to the read CRUCR tag 150.

At step/operation 404, the captured response spectra 100 is projected into the reduced dimensional space. For example, the network computing entity 10 may project the captured response spectra 100 into the reduced dimensional space determined based on the PCA. The projection of the response spectra 100 may then be multiplied by the LDA transformation matrix to determine a signature of the read CRUCR tag 150.

At step/operation 406, the tag signature stored in the enrolled tag data store 15 that is the smallest distance from the signature of the read CRUCR tag 150 is identified. For example, the network computing entity 10 may determine which tag of the enrolled tags is the smallest distance from signature of the read CRUCR tag. For example, in an example embodiment, the ED may be used to determine the distance between two tag signatures as described above.

At step/operation 408, it is determined if the distance between the signature of the read CRUCR tag and the identified tag signature is at least as small as a threshold distance. The identified tag signature is the signature identified at step/operation 406. For example, the network computing entity 10 may determine if the distance between the signature of the read CRUCR tag and the signature from the enrolled tag data store 15 identified as having the smallest distance to the signature of the read CRUCR tag in the enrolled tag data store 15 is satisfies a threshold requirement. For example, the threshold requirement may be that the distance between the signature of the read CRUCR tag and the identified tag signature be no more than a threshold distance. In an example embodiment, the threshold distance is the determined based on the equal error rate (EER) of the enrolled tag database. If the threshold requirement is not satisfied, the network computing entity 10 may determine that the read CRUCR tag 150 does not correspond to an enrolled tag and may provide an error message (e.g., via the user interface and/or communications interface 16) indicating that the read CRUCR tag does not correspond to a signature stored in the enrolled tag data store 15. If the distance between the signature of the read CRUCR tag 150 and the identified tag signature satisfies the threshold requirement (e.g., the distance is at least as small as the threshold distance), it is determined that the identified tag signature corresponds to the read CRUCR tag 150.

At step/operation 410, a response is provided. For example, the network computing entity 10 provides a response regarding the identification of the identified tag signature. For example, the network computing entity 10 may provide information/data stored in association with the identified tag signature (e.g., from the enrolled tag data store 15 and/or other data store). For example, the response may be provided via the user interface of the network computing entity 10 and/or provided to the user computing entity 30 such that the response may be provided via a user interface of the user computing entity 30.

In various embodiments, one or more second tags associated with the read CRUCR tag may be identified. For example, the one or more second tags may correspond to CRUCR tags physically coupled to the read CRUCR tag 150. For example, the one or more second tags may correspond to other blisters in the same packaging 40 as the read CRUCR tag 150. For example, the network computing entity 10 may identify (e.g., from the enrolled tag data store 15 and/or other data store) one or more second tags associated with the one or more second tags associated with the read CRUCR tag. It may then be determined, based on an RFID signal read by the RFID reader, whether the one or more second tags are located in an expected physical proximity to the first tag. For example, the RFID signal read by the RFID reader may include signatures corresponding to a plurality of CRUCR tags. The signatures for the second tags may be extracted from the RFID signal and the identity of the second tags identified (e.g., based on their feature vectors). Based on the packaging 40, it is expected that the physical coupling of the read CRUCR tag 150 and the one or more second tags is static and/or will not change. For example, the distance between the read CRUCR tag 150 and a second tag is expected to be constant due to the physical constraints of the packaging 50. Responsive to determining that the one or more second tags are not located within the expected physical proximity to the first tag, an alert may be provided. For example, if it appears that one or more of the second tags that are expected to be physically coupled to the read CRUCR tag 150 are not physically coupled to the read CRUCR tag 150 as expected, the network apparatus may provide an alert indicating that one or more of the second tags appear to be absent and/or that the physical relationship between the read CRUCR tag 150 and the one or more second tags is not as expected (e.g., possibly indicating some tampering with the product 20 and/or packaging 40). For example, the alert may be provided via the user interface of the network computing entity 10 and/or provided to the user computing entity 30 such that the alert may be provided via a user interface of the user computing entity 30.

In various embodiments, for each set of tags to be enrolled, PCA and LDA may be reapplied to determine the reduced dimensional space and LDA transformation matrix for the set of tags. For PCA, the principal components that capture the most variance at a reduced dimensionality may be recalculated. For LDA, the projections that maximize the variance between PCA projected different tag measurements and minimize the variance within PCA projected same tag measurements may be recalculated.

Another enrollment and tag identification, corresponding to an example embodiment, are described by FIGS. 13 and 14, where FIG. 13 shows the enrollment phase and FIG. 14 shows the determination of the identity of a read CRUCR tag. For example, an unsupervised machine learning approach may be used to decrease the computation requirements for enrolling new tags in the enrolled tag data store 15. The unsupervised approach would be to simply find a set of features that distinguish tags from one another, such as their resonance points, and merely perform distance calculations or compute the similarity between feature vectors. For example, a feature vector may be an example of a tag signature, in various embodiments. Examples of measures of distance that could be used include Euclidean distance (mentioned earlier), Lorentzian distance (LD), Manhattan distance (MD), and the normalized correlation coefficient (NCC).

The Lorentzian distance between the feature vector of an enrolled tag $\vec{v}^{Enroll} = (F_1^{ENROLL}, F_2^{ENROLL}, \ldots, F_N^{ENROLL})$ AND THE FEATURE VECTOR OF TUA $\vec{v}^{TUA} = (F_1^{TUA}, F_2^{TUA}, \ldots, F_N^{TUA})$ can be computed as follows $LD^{Enroll,TUA} = \sum_{r=1}^{N} \ln(1+|f_r^{Enroll} - f_r^{TUA}|)$ The Manhattan distance between $\vec{v}^{Enroll}$ and $\vec{v}^{TUA}$ can be computed as follows $MD^{Enroll,TUA} = \sum_{r=1}^{N} |f_r^{Enroll} - f_r^{TUA}|$. The normalized correlation coefficient between $\vec{v}^{Enroll}$ and $\vec{v}^{TUA}$ can be computed as follows $$NCC^{Enroll,TUA} = \frac{\left(\vec{v}^{Enroll} - \overline{\vec{v}^{Enroll}}\right) \cdot \left(\vec{v}^{TUA} - \overline{\vec{v}^{TUA}}\right)}{\left\|\vec{v}^{Enroll} - \overline{\vec{v}^{Enroll}}\right\| \times \left\|\vec{v}^{TUA} - \overline{\vec{v}^{TUA}}\right\|},$$

where $\overline{X}$, $\vec{X} \cdot \vec{Y}$, and $\|\vec{X}\|$ respectively indicate the mean value of $\vec{X}$, the dot product between $\vec{X}$ and $\vec{Y}$, and the $L^2$ norm of $\vec{X}$. Each measure has properties that are unique and such make it more ideal for certain applications than others. For example, normalized correlation coefficient computes the similarity between two normalized vectors helping to avoid any influence in similarity that could arise from outliers in the feature vectors. Using these distance measures or similarity coefficients as a method of unsupervised classification with a feature vector provides an option for easier enrollment of new tags since all that needs to be enrolled now is the feature vector of the new tag.

Starting at step/operation 502 of FIG. 13, a feature vector is extracted for each CRUCR tag 150 to be enrolled in the enrolled tag data store 15. For example, a user computing entity 30 may read a plurality of tags to be enrolled and capture a plurality of response spectra 100 from the plurality of tags. The plurality of response spectra 100 may make up at least a portion of the tag data set. The plurality of response spectra 100 may be provided (e.g., by the user computing entity 30) to the network computing entity 10 for analysis. The plurality of response spectra 100 may then be analyzed (e.g., by the network computing entity) to extract a feature vector for each CRUCR tag 150.

At step/operation 504, the extracted vectors are stored in the enrolled tag data store 15. For example, the network computing entity 10 may store the extracted vectors in the enrolled tag data store 15.

To determine the identity of a tag 150, the CRUCR tag 150 is read at step/operation 602 of FIG. 14. For example, the user computing entity 30 may emit a probe signal 35 and, responsive thereto, receive a response spectra 100 generated by the interaction of the probe signal 35 and the CRUCR tag 150 (e.g., the first and second conductive members 25, 45). The user computing entity 30 may then provide the captured response spectra 100 to the network computing entity 10. The network computing entity 10 may receive the captured response spectra 100 corresponding to the read CRUCR tag 150. The network computing entity 10 may then extract a feature vector from the response spectra 100 corresponding to the read CRUCR tag 150.

At step/operation 604, the feature vector stored in the enrolled tag data store 15 that is the smallest distance from the feature vector extracted from the read CRUCR tag 150 is identified. For example, the network computing entity 10 may determine which tag of the enrolled tags corresponds to a feature vector that is the smallest distance from the feature vector of the read CRUCR tag. For example, in an example embodiment, the ED, LD, MD, NCC, and/or the like may be used to determine the distance between two feature vectors as described above.

At step/operation 606, it is determined if the distance between the feature vector of the read CRUCR tag and the identified feature vector is at least as small as a threshold distance. The identified feature vector is the feature vector identified at step/operation 604. For example, the network computing entity 10 may determine if the distance between the feature vector of the read CRUCR tag and the feature vector from the enrolled tag data store 15 identified as having the smallest distance to the feature vector of the read CRUCR tag in the enrolled tag data store 15 is satisfies a threshold requirement. For example, the threshold requirement may be that the distance between the feature vector of the read CRUCR tag and the identified feature vector be no more than a threshold distance. In an example embodiment, the threshold distance is the determined based on the EER of the enrolled tag database. If the threshold requirement is not satisfied, the network computing entity 10 may determine that the read CRUCR tag 150 does not correspond to an enrolled tag and may provide an error message (e.g., via the user interface and/or communications interface 16) indicating that the read CRUCR tag does not correspond to a feature vector stored in the enrolled tag data store 15. If the distance between the feature vector of the read CRUCR tag 150 and the identified tag feature vector satisfies the threshold requirement (e.g., the distance is at least as small as the threshold distance), it is determined that the identified tag feature vector corresponds to the read CRUCR tag 150.

At step/operation 608, a response is provided. For example, the network computing entity 10 provides a response regarding the identification of the identified tag feature vector. For example, the network computing entity 10 may provide information/data stored in association with the identified tag feature vector (e.g., from the enrolled tag data store 15 and/or other data store). For example, the response may be provided via the user interface of the network computing entity 10 and/or provided to the user computing entity 30 such that the response may be provided via a user interface of the user computing entity 30.

B. Split Manufacturing

Figure 4:
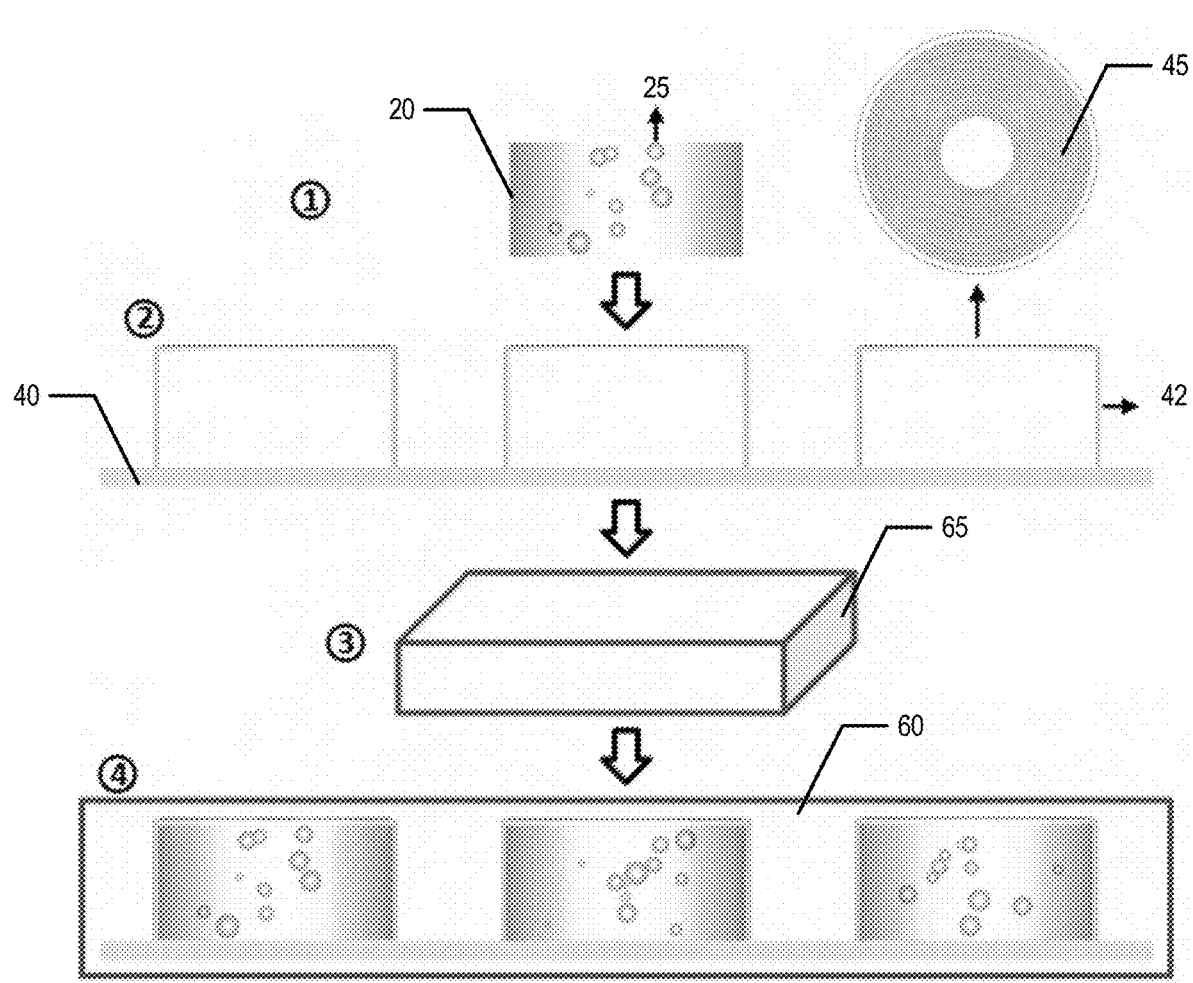
FIG. 4 illustrates various steps/operations of a split manufacturing process for manufacturing a packaged product having a CRUCR tag, according to an example embodiment of the present invention.

In this subsection, the pharmaceutical packaging process is provided as an example to introduce how CRUCR tags 150 can be integrated into products 20 and their packages 40. FIG. 10 provides a flowchart illustrating various processes, procedures, operations, and/or the likes of a split manufacturing process for CRUCR tags 150 and FIG. 4 shows the split manufacturing process for CRUCR tags 150, which includes the following steps/operations:

Starting at step/operation 202, a product 20 is manufactured, produced, and/or the like. At step/operation 204, the second conductive members 25 are embedded in and/or on the product 20. In various embodiments, step/operation 202 and step/operation 204 may occur simultaneously. For example, a pharmaceutical manufacturer may fill first conductive members 25 (e.g., silver particles of random quantity with random diameters) in random positions of a product 20 (e.g., pharmaceutical tablets). This step could happen at the formulation phase of pharmaceutical manufacturing, in an example embodiment.

At step/operation 206, the second conductive members 45 are integrated into a packaging 40 for the product 20. For example, the packaging manufacturer may integrate second conductive members 45 (e.g., a conductive pattern (e.g., a certain number of concentric ring slot resonators made of copper traces)) on the external surface of each plastic cavity or pocket of the packaging 40 (e.g., blister pack) that packages pharmaceutical tablets. One cost-effective approach for integrating second conductive members 45 (e.g., resonators) on the packaging 40 (e.g., plastic cavities or pockets) is to directly print blister packs carrying conductive patterns (e.g., copper patterns) using a 3D printer.

At step/operation 208, the product 20 having the first conductive members 25 embedded therein/thereon are packaged and/or sealed into the packaging 40. For example, a pharmaceutical packager may fill product 20 (e.g., tablets) into the plastic cavities or pockets of the packaging 40 (e.g., blister pack). The packaging 40 (e.g., blister packs) may be packaged into a paper box 65 that carries the manufacturer's logo. As should be understood, the paper box 65 is an example of exterior packaging that may be used to enclose, brand, and/or the like one or more packagings 40 and various other exterior packaging may be used in various embodiments. Tamper-evident packaging techniques could be used at when packaging and/or sealing the product 20 into the packaging 40 and/or when packaging the packaging 40 into paper box 65.

At step/operation 210, the CRUCR tag 150 formed by the product 20 sealed within the packaging 40 may be enrolled in an enrolled tag data store 15. For example, the CRUCR tag 150 may be read one or more times and the captured response spectra 100 may be analyzed and/or enrolled in an enrolled tag data store 15, for example, via one of techniques described above.

Entropy sources contributing to the uniqueness of CRUCR include process variations during the incorporation of the second conductive members 45 into the packaging 40 (e.g., in the manufacturing of the conductive pattern (e.g., variations of pattern geometric parameters and substrate dielectric constant) and randomnesses of the first conductive members 25 (e.g., silver particles (e.g., random quantities, random diameters, random positions, random sphericities, etc.)). In general, RFID tags would be outsourced to a third-party company (blister pack manufacturer in this example context). This proposed split manufacturing approach carries far-reaching significance since it prevents untrusted tag manufacturer from recording the frequency response spectra of all CRUCR tags 150 and performing replay attack during tag authentication. Admittedly, an adversary could purchase a small number of products carrying authentic tags from the market, recording their frequency response spectra, and performing replay attack during tag authentication. However, the resulting anomaly (a large quantity of tag signatures corresponding to a small number of tags appearing at different locations) could easily be detected and isolated at a low cost.

C. Example Simulation Results

In this section, the evaluation model (e.g., CRUCR tags integrated into pharmaceutical tablets and their packages) and results are described in greater detail, along with the evaluation of the performance of CRUCR tags in terms of uniqueness and reliability.

Figure 7:
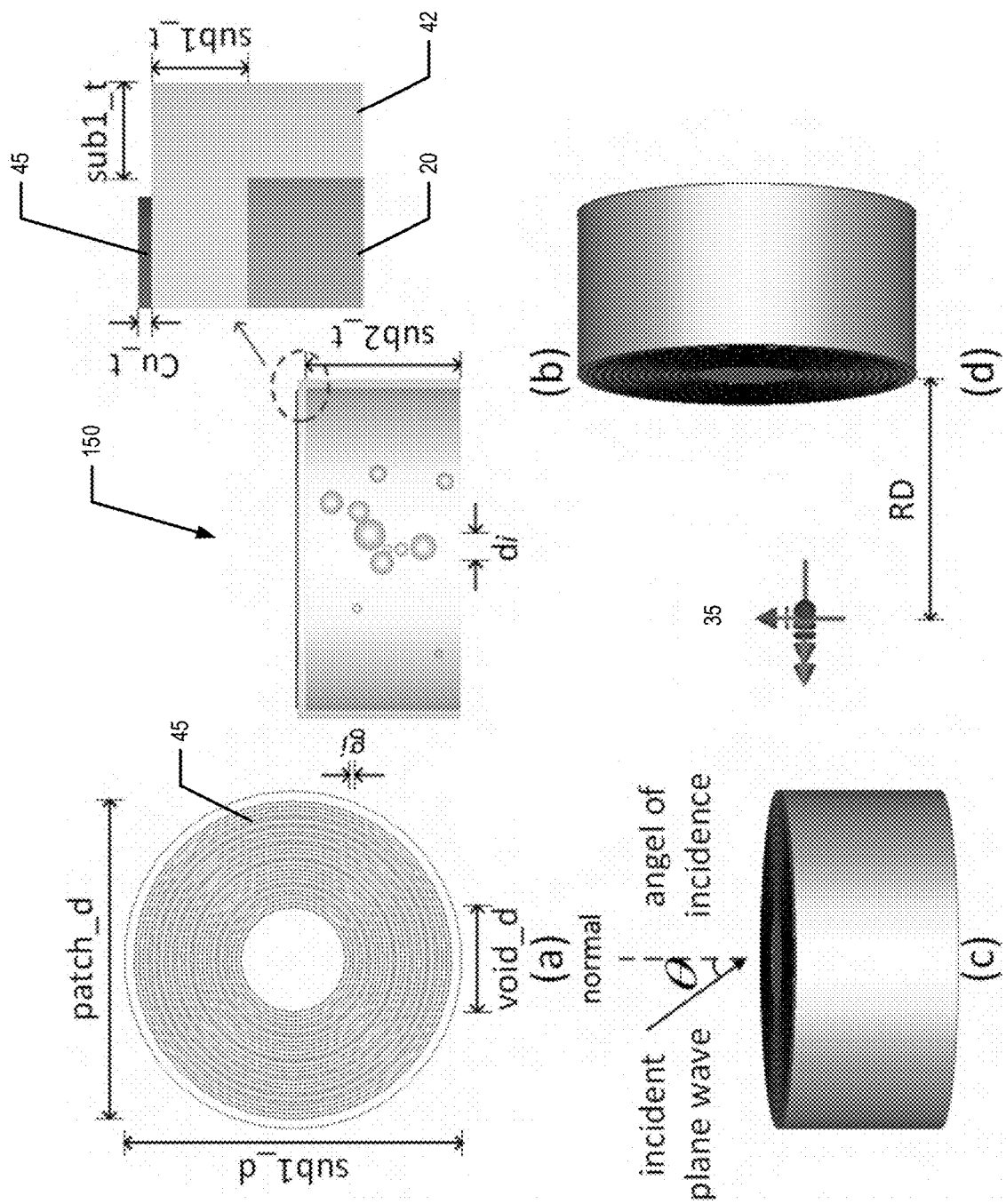
FIG. 7 illustrates an example embodiment of probing a CRUCR tag, according to an example embodiment of the present invention.

In an example simulation, CST Microwave Studio 2015 was used as the simulation platform. Again, the CRUCR tags 150 are integrated into pharmaceutical tablets as the product 20 and blister pack that packages them as the packaging 40 as an example. FIG. 7 illustrates the simulation setup. The proposed CRUCR tag consists of two parts: (i) the first conductive members which, in this example embodiment, consists of nontoxic silver particles of random quantity with random diameters filled in random places of each pharmaceutical tablet; and (ii) the second conductive members which, in this example embodiment, consists of 12 concentric ring slot resonators integrated on the external surface of each plastic cavity or pocket of blister pack that packages pharmaceutical tablets. The metallic pattern is made of pure copper, in this example embodiment. A circularly polarized plane wave is used as the probe signal 35, in this example embodiment, to stimulate the CRUCR tag. The radio cross-section (RCS) probe is placed 50 mm away from the tag to detect the response spectra 100. Table II provided in FIG. 16 summarizes the simulation parameters. Substrate thickness and air gaps conform to normal distributions with design values as the mean values and tolerances as the triples of standard deviations, in this example embodiment. Quantity and diameters of silver particles conform to discrete uniform distribution and continuous uniform distribution respectively. The silver particles are randomly distributed inside the tablet. The frequency band used by CRUCR tags ranges from 7 GHz to 23 GHz, in this example embodiment.

i. Euclidean Distance Based Tag Recognition

Figure 8:
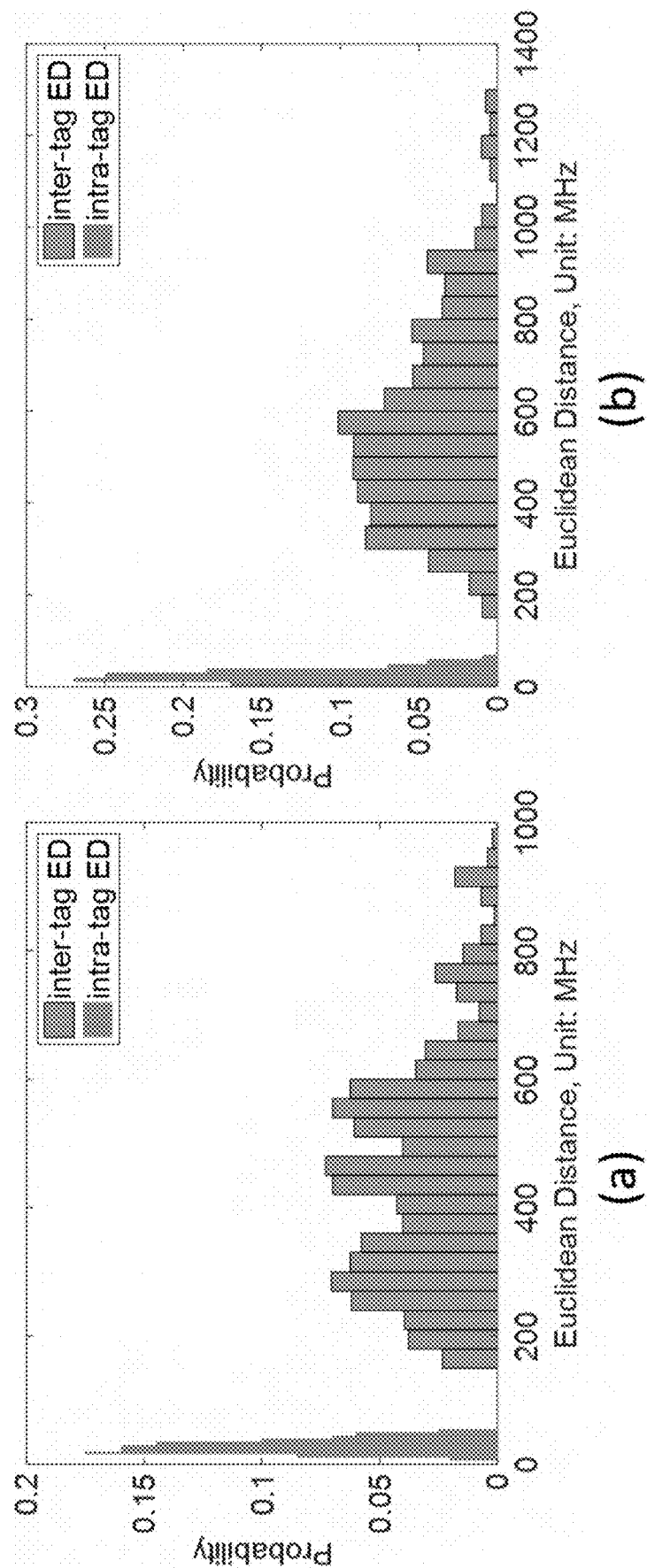
FIG. 8 illustrates the effectiveness of Euclidean distance-based tag recognition in the presence of environmental noise and with varying incident angles, according to an example embodiment.

In this subsection, the effectiveness of Euclidean distance based tag recognition in the presence of environmental noise and with varying angles of plane wave incidence is analyzed. 20 tag samples conforming to the constraints depicted in Table II provided in FIG. 16 were generated using pseudo random number generators. Every sample was measured 5 times at different conditions (e.g., different noise sources, varying angles of plane wave incidence, etc.). FIG. 8(*a*) illustrates the inter-tag and intra-tag Euclidean distance distributions of CRUCR tags in the presence of random white Gaussian noise (WGN) with a signal-to-noise ratio (SNR) of 20 dB in this example simulated embodiment. 20 dB is usually recommended as the minimum SNR for a good RF deployment of the wireless local area network (WLAN). The margin between minimum inter-tag Euclidean distance and maximum intra-tag Euclidean distance reaches approximately 103.6 MHz. FIG. 8(*b*) shows the inter-tag and intra-tag Euclidean distance distributions of CRUCR tags when the angle of incident probe signal 35 (e.g., plane wave in this example embodiment; see FIG. 7(*c*)) varies from 0° to 20°. The margin between minimum inter-tag Euclidean distance and maximum intra-tag Euclidean distance reaches approximately 110.5 MHz. In order to achieve high accuracy of tag recognition, the varying angle of incident plane wave should be no larger than 20°. These simulation results demonstrate that the Euclidean distances between signatures of CRUCR tags are effective at differentiating each other.

ii. Machine Learning Based Tag Recognition

The resonance points in the response spectrum 100 of each CRUCR tag 150 are taken as features and used in an unsupervised method for classification/verification. In an example embodiment, this process involves using a valley detection algorithm to detect the resonance points, which appear as local minima in the spectrum bandwidth of 9-21 GHz, and computing the minimum distance or highest similarity with a tag already enrolled in the enrolled tag data store 15 (e.g., database). In order to holistically evaluate the usefulness of such an unsupervised classification methodology, the tags are evaluated by selecting a group of tags from a set of measurements to serve as the gallery (enrolled) set and then use the remaining tags to serve as the probe (verification) set. The performance is evaluated in this manner so each measurement group serves as a gallery at least once and as probe the rest of the time. For example, in terms of the data set (15 tags, 15 measurements for each tag) this will result in a total of 3,375 classification attempts for all the tags. Furthermore, three different distance/similarity measures (e.g., Lorentzian distance, Manhattan distance, and normalized correlation coefficient) were used to evaluate the robustness of this technique given that different measures have different advantages. Lastly, Manhattan distance was used again but in conjunction with the Haar wavelet transform at scale values of 1 to 8. The sum of the diagonals across the resultant distance matrix is used to determine similarity between the tags and the minimum diagonal distance sum represents the correct tag identification. The results for these different unsupervised classification methods are shown in Table III provided in FIG. 17. These results clearly demonstrate that the tags can be effectively identified at a high rate via unsupervised methods. All the scores are above 90% which means that out of the 3,375 classification attempts there were more than 3,037 correct identifications.

Figure 5:
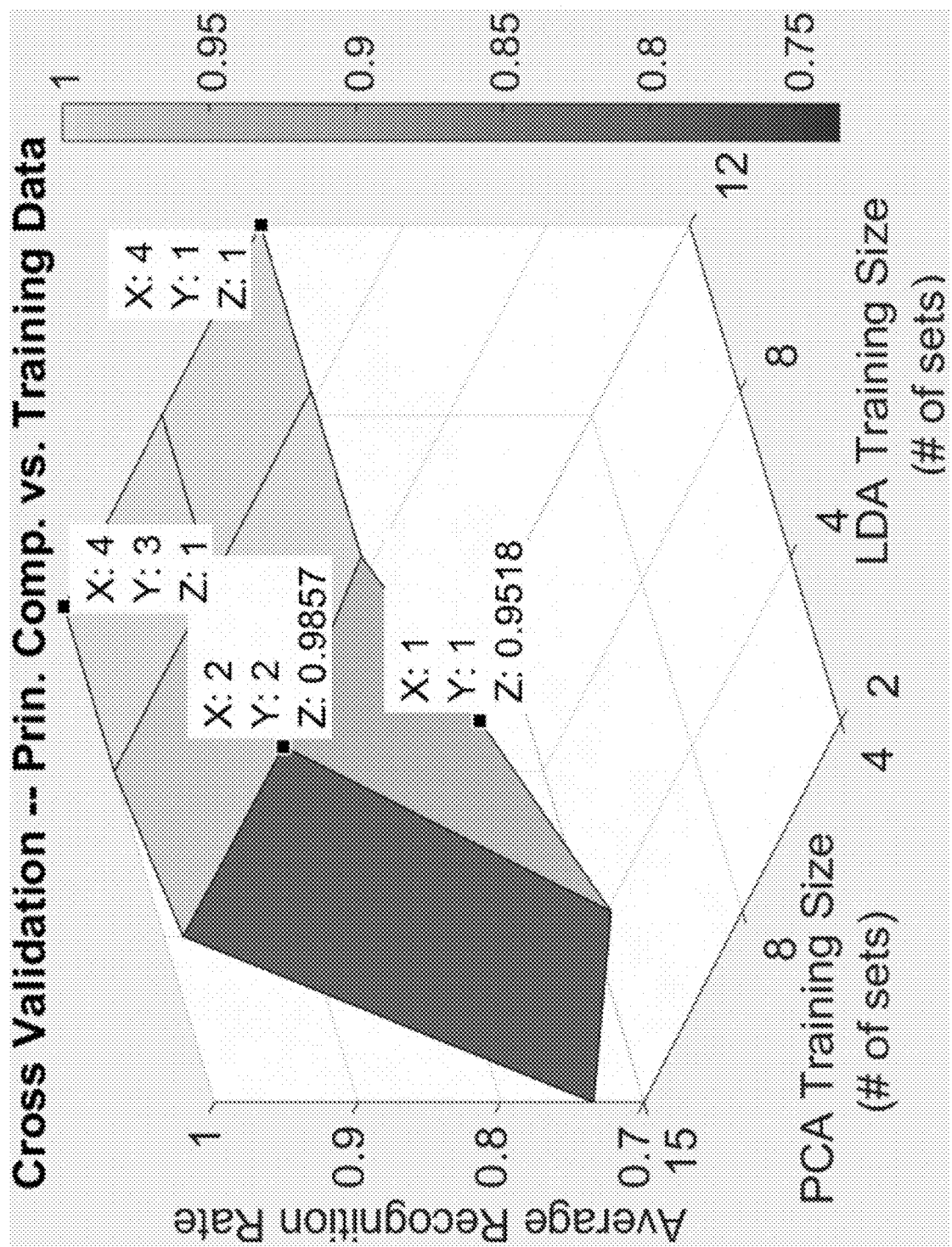
FIG. 5 illustrates example simulation results of the cross-validation process of recognizing a CRUCR tag, according to an example embodiment of the present invention.

By combining the already unique properties of each tag with a powerful supervised classifier in LDA, the system can further improve upon its discriminatory power. This classifier takes the already rich spectrum of each tag and instead of focusing only on a small bit of spectrum information, such as their resonance points, it looks at the most discriminating features of each tag's entire spectrum. However, it is important to note that since each tag spectrum has such a high amount of sampling points, 8000 in the simulations, using the entire spectrum for the classifier would be impractical. Therefore, PCA is applied to the spectra prior to training and classification for dimensionality reduction. Then the resultant signals are used for training the classifier and then testing as well. In order to evaluate the supervised learning approach as holistically as the unsupervised approaches, the LDA classifier went through cross-validation comparing the performance based on different partitions of data used for computing the principal components and different partitions used for training the classifier after PCA. The performance surface in FIG. 5 visually shows the results of the cross-validation process for these simulated measurements, where the triple (xT, yM, zS) represents the data set of x tags-y measurements for each tag-z sampling points for each measurement. The figure shows that as long as the classifier is trained on more than 2 sets of measurements, regardless of the amount of data used for computing the principal components, it will outperform almost all of the unsupervised techniques since nearly all of the scores in the upper region are near 100% recognition.

Furthermore, these results emphasize that the unique properties of CRUCR tags in conjunction with either supervised or unsupervised learning techniques would make a strong verification system for the supply chain.

iii. Attack Analysis

In this subsection, the resilience of CRUCR system to the potential attacks is analyzed. CRUCR system is resistant to cloning attack since the adversaries cannot easily model the uncontrollable process variations during tag fabrication. CRUCR system is resistant to split attacks (e.g., separating tag from product, swapping tags, etc.) since it establishes an inseparable connection between tag and identified object. Even if the adversaries could swap the copper patterns on the external surfaces of different plastic cavities or pockets, they cannot simultaneously swap the silver particles embedded in the tablets without changing their initial positions and compromising the tablets. By binding the signatures of different components within the same blister pack, CRUCR system is resistant to illegal component replacement. CRUCR system is intrinsically resistant to DoS attack performed in the form of overwriting tag memory since tag memory has been eliminated from the CRUCR tag. As discussed in Subsection III-C, our proposed split manufacturing approach makes it much more difficult for the adversaries to perform replay attack.

V. CONCLUSION

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An unclonable chipless radio frequency identification (RFID) tag, the tag comprising:
   a first tag portion comprising one or more first conductive members unremovably secured to a dielectric item; and
   a second tag portion comprising a conductive pattern,
   wherein (a) the first tag portion and the second tag portion are in a static physical relationship with respect to one another, and (b) the first tag portion and the second tag portion are independently secured with respect to the dielectric item.

2. The tag of claim 1, wherein the one or more first conductive members comprise a plurality of metal particles that are at least one of (a) randomly-sized or (b) randomly disposed with respect to the dielectric item.

3. The tag of claim 1, wherein the one or more first conductive members comprise a plurality of metal particles that are at least one of (a) randomly disposed on the surface of the dielectric item or (b) randomly embedded within at least a portion of the dielectric item.

4. The tag of claim 1, wherein (a) the dielectric item is a product, (b) the second tag portion is integrated into a packaging, and (c) the product is enclosed within the packaging.

5. The tag of claim 4, wherein the packaging comprises at least one of a plastic or paper package.

6. The tag of claim 4, wherein the packaging is a blister pack and the product is a pharmaceutical such that the tag provides for pill-level tracking.

7. The tag of claim 4, wherein the conductive pattern comprises one or more concentric ring slot resonators.

8. A method for reading an unclonable chipless radio frequency identification (RFID) tag, the method comprising:
reading a tag spectra of the RFID tag using an RFID reader;
determining a feature vector of the tag spectra;
identifying a first tag from a database storing a plurality of enrolled tags, the first tag associated with an enrolled feature vector that has a minimum distance from the feature vector of the tag spectra compared to a remainder of the plurality of enrolled tags; and
responsive to determining that the minimum distance satisfies the tag matching threshold, providing an indication of the entity of the tag.

9. The method of claim 8, further comprising responsive to determining that the minimum distance does not satisfy the tag matching threshold, providing an indication that the tag does not correspond to any of the plurality of enrolled tags.

10. The method of claim 8, further comprising projecting the tag spectra into a reduced dimensionality space determined based on a principle component analysis of spectra associated with at least a portion of the plurality of enrolled tags.

11. The method of claim 8, wherein the feature vector is determined using a model trained using machine learning.

12. The method of claim 8, wherein a distance between the enrolled feature vector associated with one of the plurality of enrolled tags and the feature vector of the tag spectra is one of a Euclidean distance, Lorentzian distance, Manhattan distance, or normalized correlation coefficient.

13. The method of claim 8, wherein the RFID tag comprises:
a first tag portion comprising one or more first conductive members unremovably secured to a product; and
a second tag portion comprising one or more second conductive members integrated into a packaging,
wherein the product is enclosed within the packaging such that the tag spectra is generated by the one or more first conductive members and the one or more second conductive members.

14. The method of claim 8, wherein the tag matching threshold is determined based on an equal error rate of the plurality of enrolled tags.

15. The method of claim 8, wherein enrolling the plurality of enrolled tags in the database comprises:
determining one or more principal components of spectra of the plurality of enrolled tags;
projecting the spectra into a reduced dimensional space using the principal components;
determine transformation matrix using linear discriminant analysis of spectra projected into the reduced dimensional space;
applying the transformation matrix to a selected spectra of the spectra of the plurality of enrolled tags corresponding to a selected tag of the plurality of enrolled tags to generate a selected feature vector for selected tag; and
storing the selected feature vector in the database in association with information corresponding to the selected tag.

16. The method of claim 8, further comprising:
identifying one or more second tags associated with the first tag, the one or more second tags corresponding to unclonable chipless RFID tags physically coupled to the first tag;
determining, based on an RFID signal read by the RFID reader, whether the one or more second tags are located in an expected physical proximity to the first tag;
responsive to determining that the one or more second tags are not located within the expected physical proximity to the first tag, providing an alert.

17. A method for manufacturing an unclonable chipless radio frequency identification (RFID) tag, the method comprising:
securing one or more first conductive members to a dielectric item;
preparing a conductive pattern; and
securing the conductive pattern into a fixed physical relationship with the dielectric item, wherein the first tag portion and the second tag portion are independently secured with respect to the dielectric item.

18. The method of claim 17, wherein (a) the dielectric item is a product, (b) the conductive pattern is a packaging for the product, and (c) securing the conductive pattern into a fixed physical relationship with the dielectric item comprises enclosing the product within the packaging.

19. The method of claim 17, further comprising:
capturing one or more instances of a tag spectra generated by the RFID tag using an RFID reader;
determining one or more principal components of the tag spectra;
projecting the tag spectra into a reduced dimensional space using the principal components;
applying a transformation matrix to the tag spectra projected into the reduced dimensional space to generate a feature vector for the RFID tag; and
storing the feature vector in a database in association with information corresponding to the RFID tag.

20. The method of claim 19, wherein the tag spectra are analyzed by a machine learning model to identify the one or more principal components of the tag spectra.

* * * * *